US008972677B1

(12) United States Patent
Jones

(10) Patent No.: US 8,972,677 B1
(45) Date of Patent: Mar. 3, 2015

(54) SYSTEMS AND METHODS FOR IMPLEMENTING A STORAGE INTERFACE SPECIFIC TO AN ARCHIVING PLATFORM

(75) Inventor: Richard Jones, Reading (GB)

(73) Assignee: Symantec Corporation, Mountain View, CA (US)

( * ) Notice: Subject to any disclaimer, the term of this patent is extended or adjusted under 35 U.S.C. 154(b) by 1110 days.

(21) Appl. No.: 12/493,722

(22) Filed: Jun. 29, 2009

(51) Int. Cl.
*G06F 12/00* (2006.01)
*G06F 13/00* (2006.01)
*G06F 13/28* (2006.01)

(52) U.S. Cl.
USPC .......................................... 711/161; 711/162

(58) Field of Classification Search
None
See application file for complete search history.

(56) References Cited

U.S. PATENT DOCUMENTS

| 6,769,022 | B1* | 7/2004 | DeKoning et al. | 709/223 |
|---|---|---|---|---|
| 7,010,796 | B1* | 3/2006 | Strom et al. | 719/328 |
| 7,672,934 | B1* | 3/2010 | Beatty et al. | 707/999.003 |
| 7,680,843 | B1* | 3/2010 | Panchbudhe et al. | 707/999.204 |
| 2003/0070001 | A1* | 4/2003 | Belknap et al. | 709/321 |
| 2003/0193994 | A1* | 10/2003 | Stickler | 375/150 |
| 2003/0233494 | A1* | 12/2003 | Ghosh et al. | 710/1 |
| 2005/0050537 | A1* | 3/2005 | Thompson et al. | 717/165 |
| 2005/0091461 | A1* | 4/2005 | Kisley et al. | 711/162 |
| 2005/0283594 | A1* | 12/2005 | Kano | 713/1 |
| 2008/0133854 | A1* | 6/2008 | Fukuguchi | 711/161 |
| 2009/0024752 | A1* | 1/2009 | Shitomi | 709/230 |
| 2009/0119354 | A1* | 5/2009 | Stuart et al. | 707/206 |
| 2010/0017184 | A1* | 1/2010 | Vijayan Retnamma et al. | 703/13 |
| 2010/0082682 | A1* | 4/2010 | Kinoshita | 707/784 |

OTHER PUBLICATIONS

"XAM Mission and Goals"; (accessed May 21, 2009); SNIA—XAM Initiative; http://www.snia.org/forums/xam/.
"ADK Interface", (accessed May 21, 2009); http://help.sap.com/saphelp_nwpi71/helpdata/en/2a/fa03ec493111d182b70000e829fbfe/content.htm.
Moore, Reagan W.; "Data Grids for Collection Federation" (accessed May 21, 2009); University of California, San Diego; http://www.us-vo.org/pubs/files/NVO-data-grids.ppt.

* cited by examiner

*Primary Examiner* — Yaima Rigol
(74) *Attorney, Agent, or Firm* — ALG Intellectual Property, LLC

(57) ABSTRACT

A computer-implemented method for implementing an archiving-platform-specific storage interface. The method may include defining an application programming interface specification for a specific archiving platform. The method may also include providing the application programming interface specification to a storage system vendor. The method may further include archiving, using the specific archiving platform, data to a storage system provided by the storage system vendor. Archiving the data may include calling an application programming interface that complies with the application programming interface specification and communicating with the storage system through the application programming interface. Various other methods, systems, and computer-readable media are also disclosed.

20 Claims, 6 Drawing Sheets

SYSTEMS AND METHODS FOR IMPLEMENTING A STORAGE INTERFACE SPECIFIC TO AN ARCHIVING PLATFORM

BACKGROUND

Now more than ever, businesses run on Information Technology ("IT"). In recent years, IT has expanded to cover an increasing number of business applications as well as vigorous year-over-year growth in storage—including email, graphics, audio, and video files that grow steadily in resolution and length. Protecting all of this information involves careful planning and management, and an important component in any comprehensive data-protection scheme includes data archiving.

Data archiving is the process of storing historical data and may be performed by a data archiving platform. An archiving platform may need to be able to interface with numerous underlying storage systems provided by various storage system vendors. Each storage system typically has its own proprietary interface, and archiving platform providers may need to include specific code for each storage system with which the archiving platform may communicate. Thus, creating and maintaining an archiving platform that supports the ever-increasing number of storage systems available on the market may be time-consuming and expensive. Some storage systems offer standardized protocol gateways (e.g., a CIFS gateway). However, using a standardized protocol gateway may result in increased costs, decreased scalability, and increased complexity.

SUMMARY

As will be described in greater detail below, the instant disclosure generally relates to systems and methods for implementing archiving-platform specific interfaces. In some embodiments, a computer-implemented method may include defining an Application Programming Interface ("API") specification for a specific archiving platform, providing the API specification to a storage system vendor, and archiving, using the specific archiving platform, data to a storage system provided by the storage system vendor. Archiving the data may include calling an API that complies with the API specification and communicating with the storage system through the API.

In some embodiments, the API may be programmed to allow storage system configuration data to be managed from within the specific archiving platform. In certain embodiments, the API specification may define data retention functionality of the specific archiving platform, at least one metadata management functionality of the specific archiving platform, external regulation compliance functionality of the specific archiving platform, data securing functionality of the specific archiving platform, and/or functionality of the specific archiving platform for interfacing with a Write Once/Read Many ("WORM") storage system. According to various embodiments, the archiving platform may be storage-system agnostic. In some embodiments, the method may be tangibly embodied as computer-executable instructions on at least one computer-readable-storage medium.

According to certain embodiments, a computer-implemented method may include identifying an API specification for a specific archiving platform, creating, based on the API specification, an API for a storage system, and including the API with the storage system to allow the specific archiving platform to interface with the storage system. In some embodiments, creating the API may include programming the API to allow storage system configuration data to be managed from within the specific archiving platform.

In certain embodiments, the method may include identifying a specification of data retention functionality of the specific archiving platform in the API specification. In such embodiments, creating the API may include programming the API to support the data retention functionality of the specific archiving platform. In various embodiments, the computer-implemented method may include identifying a specification of metadata management functionality of the specific archiving platform in the API specification. In such embodiments, creating the API may include programming the API to support the metadata management functionality of the specific archiving platform.

In various embodiments, the method may include identifying a specification of external regulation compliance functionality of the specific archiving platform in the API specification. In such embodiments, creating the API may include programming the API to support the external regulation compliance functionality of the specific archiving platform. In some embodiments the method may include identifying a specification of data securing functionality of the specific archiving platform in the API specification. In such embodiments, creating the API may include programming the API to support the data securing functionality of the specific archiving platform.

In certain embodiments, the method may include identifying, in the API specification, a specification of functionality of the specific archiving platform for interfacing with a Write Once/Read Many ("WORM") storage system. In such embodiments, creating the API may include programming the API to support the functionality of the specific archiving platform for interfacing with a WORM storage system. According to various embodiments, the method may be tangibly embodied as computer-executable instructions on at least one computer-readable-storage medium.

According to at least one embodiment, a system may include at least one processor and a communication interface configured to provide an API specification to a storage system vendor. The API specification may define functionality of a specific archiving platform. The system may also include an archiving platform programmed to direct the processor to archive data to a storage system provided by the storage system vendor by (1) calling an API that complies with the API specification and (2) communicating with the storage system through the API. In some embodiments, the API specification may define data retention functionality of the specific archiving platform. In certain embodiments, the API specification may define data securing functionality of the specific archiving platform.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
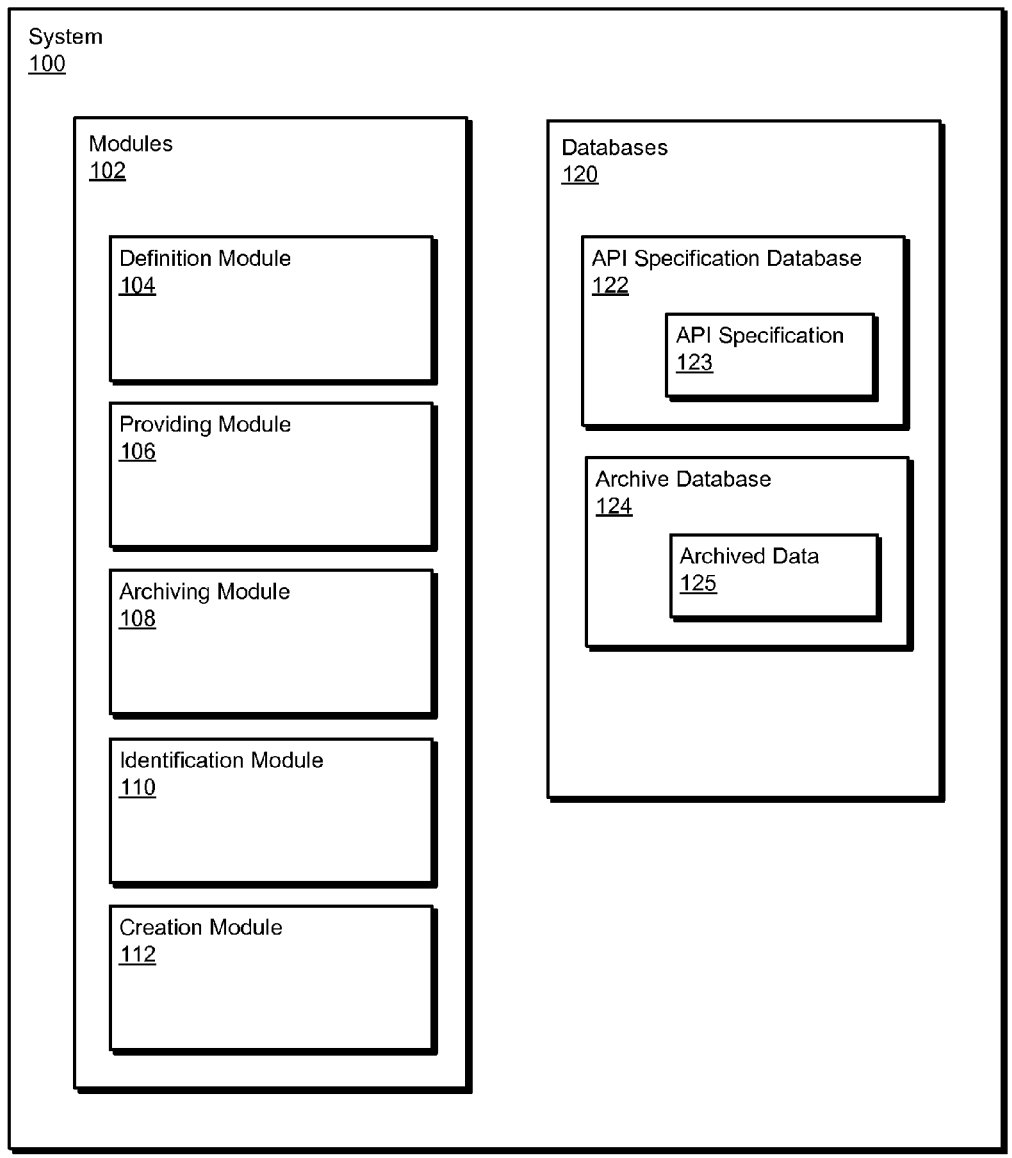
FIG. 1 is a block diagram of an exemplary system for implementing an archiving-platform-specific storage interface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for implementing archiving-platform-specific storage interfaces. In some embodiments, an archiving platform provider may define an Application Programming Interface ("API") specification for a specific archiving platform, and the API specification may be provided to a storage system vendor. The storage system vendor may use the API specification to create an API for a storage system and may include the API with the storage system. The archiving platform may then call the API to interface with the storage system to archive data to the storage system. Embodiments of the instant disclosure may reduce and/or eliminate implementation costs and other overhead traditionally required for archiving product suppliers to support new or additional storage systems. Embodiments of the instant disclosure may also provide various other features and advantages as discussed in the following description.

As used herein, the phrase "storage system vendor" may refer to any entity that provides one or more components of a storage system and/or support for one or more components of a storage system. For example, storage system vendors may include suppliers of physical storage devices and/or suppliers of software and/or firmware for enabling archiving platforms to interact with physical storage device. As used herein, the phrase "archiving platform provider" may refer to any entity to develops, sells, and/or markets archiving platforms.

Figure 2:
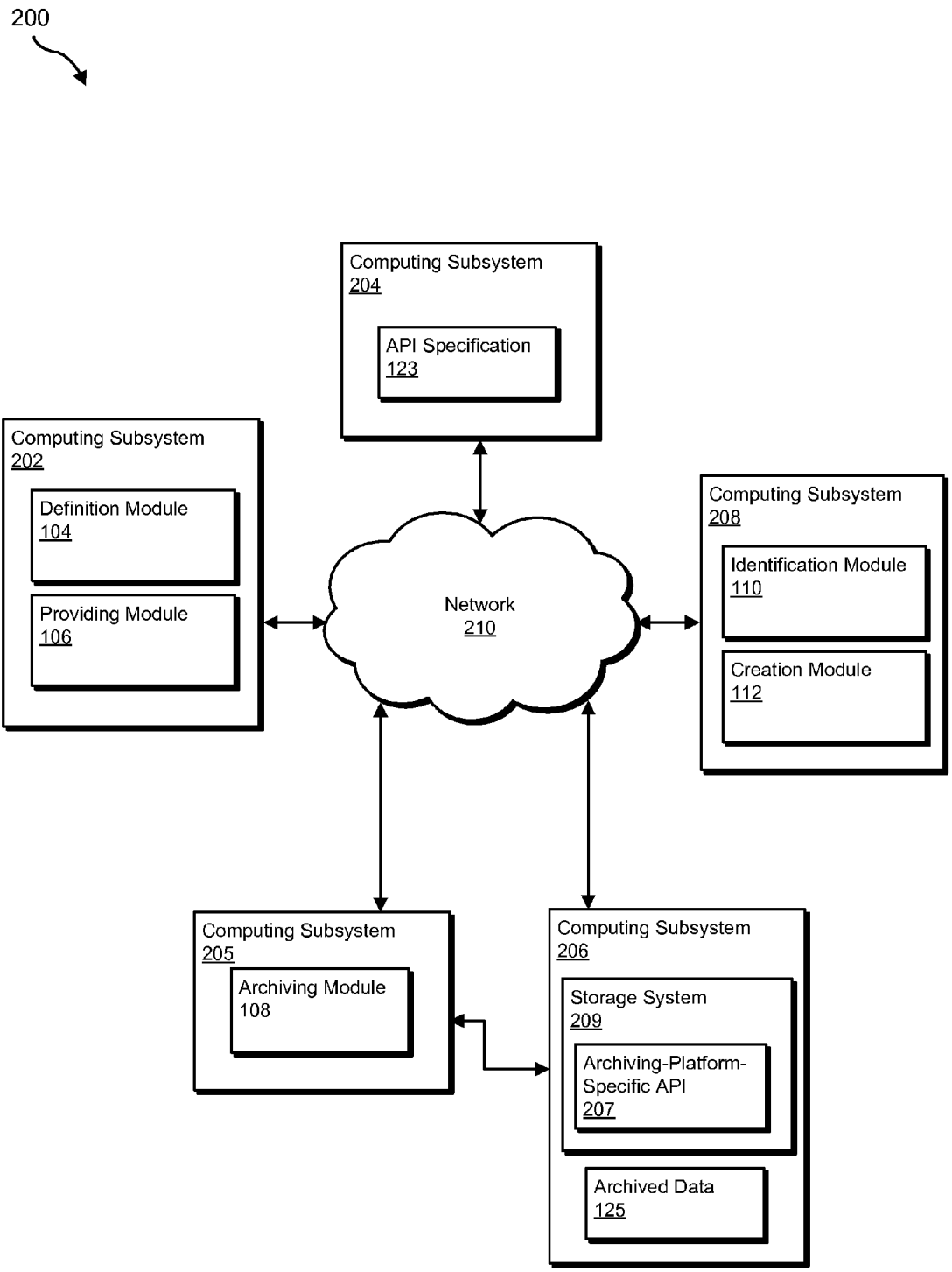
FIG. 2 is a block diagram of another exemplary system for implementing an archiving-platform-specific storage interface.

The following will provide, with reference to FIGS. 1-2, detailed descriptions of exemplary systems for implementing archive-platform-specific storage interfaces. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

Embodiments of the present disclosure are directed to archiving platforms. As used herein, the term "archiving" generally refers to storing historical data, the term "archiving platform" generally refers to archiving software, and the term "archive" general refers to data stored through the process of archiving. Archiving platforms may store data in compliance with a variety of policies. For example, archiving may provide compliance with governmental regulations and/or an organization's own governance policies. Archiving may also be used to improve the efficiency of applications and of backup and storage processes. Archiving data may be more cost efficient than backing up data and may therefore be used in place of creating backups in some situations. Archiving may also be used for various other reasons.

FIG. 1 is a block diagram of an exemplary system 100 for implementing an archiving-platform-specific storage interface. As illustrated in this figure, exemplary system 100 may include one or more modules 102 for performing one or more tasks. For example, and as will be explained in greater detail below, exemplary system 100 may include a definition module 104 programmed to define an API specification for a specific archiving platform and a providing module 106 programmed to provide the API specification to a storage system vendor. Exemplary system 100 may also include an archiving module 108 programmed to use an archiving-platform-specific API to archive data to a storage system from the storage system vendor. System 100 may further include an identification module 110 programmed to identify the API specification and a creation module 112 programmed to use the API specification to create the archiving-platform-specific API. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include an API specification database 122 for storing API specifications, such as API specification 123. Exemplary system 100 may also include an archive database 124 for archiving data, such as archived data 125.

Databases 120 in FIG. 1 may represent a portion of one or more computing devices. For example, databases 120 may represent computing system 510 in FIG. 5 and/or portions of exemplary network architecture 600 in FIG. 6. Alternatively, databases 120 in FIG. 1 may represent one or more physically separate devices capable of being accessed by a computing device, such as computing system 510 in FIG. 5 and/or portions of exemplary network architecture 600 in FIG. 6.

FIG. 2 is a block diagram of an exemplary system 200 for implementing an archiving-platform-specific storage interface. As illustrated in this figure, exemplary system 200 may include computing subsystems 202, 204, 205, 206, and 208. In some embodiments, computing subsystem 202 may be a computing device of an archiving platform provider and may include definition module 204 and providing module 206. An API specification defined by definition module 104, such as API specification 123, may be made available to storage vendors through computing subsystem 204, which may be a server that provides one or more API specifications. As used herein, the term "API" generally refers to a software interface. An API may include one or more routines, data structures, object classes, and/or protocols that support the interaction of an archiving platform and a storage system. For example, an archiving-platform specific API may store, retrieve, and/or delete archiving platform content streams to and from a disk-based external storage system (or other storage system) at the request of the archiving platform.

In some embodiments, computing subsystem 208 may be a computing subsystem of a storage vendor and may include identification module 110 and creation module 112. The storage vendor may provide a storage system (e.g., storage system 209) that includes an archiving-platform-specific API (e.g., archiving-platform-specific API 207). A consumer (e.g., an enterprise) may obtain an archiving platform (e.g., archiving module 108) from the archiving platform provider and may obtain a storage system (e.g., storage system 209) from the storage system vendor. The consumer may install archiving module 108 on computing subsystem 205 to archive data on computing subsystem 205. The consumer may include storage system 209 from the storage vendor in computing subsystem 206. Storage system 209 may also include archiving-platform-specific API 207 to allow archiving module 108 to interface with the storage system to archive data, such as archived data 125.

As used herein, the phrase "storage system" generally refers to any storage device, firmware, and/or software for storing data. Storage systems may include magnetic disk drives (e.g., hard drives), magnetic tape drives, optical disk drives, flash drives, solid state drives, any other store media, and/or any type or form of interface or device for transferring data between storage devices.

Computing subsystems 202, 204, 206, and 208 generally represent any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, one or more components of exemplary computing system 510 in FIG. 5, one or more components of exemplary network architecture 600 in FIG. 6, or any other suitable computing device.

Computing subsystems 202, 204, 205, 206, and 208 may communicate over network 210. Network 210 generally represents any medium or architecture capable of facilitating communication or data transfer. Examples of network 210 include, without limitation, an intranet, a wide area network ("WAN"), a local area network ("LAN"), a personal area network ("PAN"), the Internet, power line communications ("PLC"), a cellular network (e.g., a GSM Network), all or a portion of exemplary network architecture 600 in FIG. 6, or the like. Network 210 may facilitate communication or data transfer using wireless or wired connections.

Figure 3:
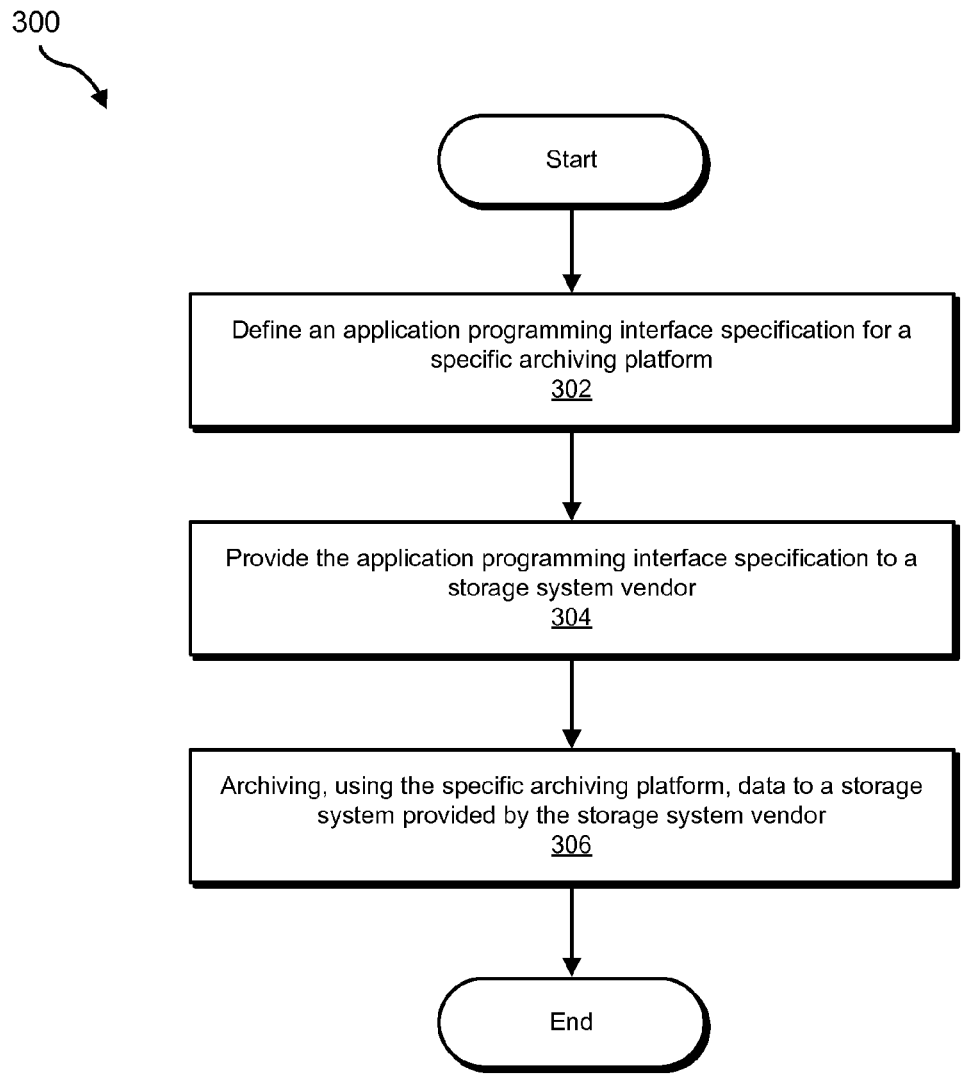
FIG. 3 is a flow diagram of an exemplary method for providing a specification for an archiving-platform-specific storage interface.

FIG. 3 is a flow diagram of an exemplary computer-implemented method 300 for implementing an archiving-platform-specific storage interface. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 310 definition module 104 may, as part of computing subsystem 202, define an API specification for a specific archiving platform.

As used herein, the phrase "specific archiving platform" generally refers to a particular archiving platform. For example, the phrase "specific archiving platform" may refer to a particular archiving platform from an archiving platform provider and/or a particular version of an archiving platform. Examples of specific archiving platforms include, without limitation, SYMANTEC ENTERPRISE VAULT, EMC's DOCUMENTUM, IBMs DB2 COMMONSTORE, ZANTAZ ENTERPRISE ARCHIVE SOLUTION, and any other specific archiving platforms.

As previously noted, archiving platforms may provide a variety of functionality. Archiving platforms may take data that is no longer needed on a daily or short-term basis and move the data to another location (often less expensive storage), where it may be archived for the long term. Archiving platforms may protect, organize, and search unstructured information. Archiving platforms may provide an organized, searchable store of single-instance records, with capabilities to meet the specialized demands of legal discovery. Some archiving platforms may support data deduplication, integrated storage management, compression, encryption, other data securing functions, regulatory compliance and corporate compliance, and various other data retention functions.

The API specification may define any functionality of the archiving platform. In some embodiments, the API specification may define data retention functionality of the specific archiving platform. For example, the API specification may define functionality of the archiving platform relative to event-based retention, fixed retention, extending retention of data, deletion and/or expiration of data, and/or any other functionality, policy, or parameter related to retaining data using the specific archiving platform. In some embodiments, the API specification may define retention types supported by the specific archiving platform. Retention types may include "no retention" (i.e., no retention should be enforced and it should be possible to delete the content stream at any time), "definite retention" (i.e., the retention date specified by a retention date parameter should be enforced), "indefinite retention" (i.e., retention is yet to be determined and deletion of the content stream should not be permitted), and/or "infinite retention" (i.e., infinite retention should be enforced and deletion of the content stream should not be permitted).

In certain embodiments, the API specification may define data securing functionality of the specific archiving platform. For example, the API specification may describe disk-to-disk mirroring functionality, secure-archive device support, encryption functionality, and/or any other data securing functionality of the specific archiving platform.

The API specification may additionally or alternatively define metadata functionality of the specific archiving platform. For example, the API specification may describe how the specific archiving platform stores, retrieves, and/or deletes metadata that is associated with the primary archived data. In some embodiments, the API specification may describe the functionality of the specific archiving platform for interfacing with a Write Once/Read Many ("WORM") storage system and/or any other specific type of storage device or system.

The API specification may define external regulation compliance functionality of the specific archiving platform. For example, the API specification may describe how the specific archiving platform may be used to comply with governmental regulations and/or other external regulations. The API specification may also describe how the specific archiving platform may be used to comply with internal regulations. In some embodiments, the API specification may describe how the specific archiving platform collects, delivers, searches, and/or analyzes data for electronic discovery and/or other investigations (e.g., audits). In certain embodiments, the API specification may define data storage capacity parameters of the specific archiving platform. The API specification may also describe how to integrate with the specific archiving platform to allow storage system configuration data to be managed from within the specific archiving platform.

An API specification may define functionality of an archiving platform by defining or describing one or more interfaces needed for an archiving platform to interface with third party software components that store archiving platform content streams. Such streams may be stored to a disk based external storage system, which may appear as primary storage within an archiving platform console.

In some embodiments, an API specification may describe the details of an interface implemented by an archive-platform-specific API and/or a callback interface implemented by an archiving platform. For example, an API specification may define a Component Object Model ("COM") interface implemented by archive-platform-specific API and called by an archiving platform. The definition of the COM interface may indicate whether the archiving platform is a 32 or 64 bit application, define how COM object instances are instantiated and called (e.g., from a single thread, using multiple threads, using multiple processes, etc.), describe how an archive-platform-specific API should use resources, identify whether the archiving platform provides the facility to automatically rollover partitions, describe how the archiving platform handles a storage array or cluster of nodes, define sizes of content streams supported by an archiving platform, and/or provide various other information about the archiving platform.

According to certain embodiments, an API specification may provide information about methods of the COM interface. For example, an API specification may describe parameters, return values, error codes, and other information associated with one or more methods. An API specification may define methods the archiving platform uses to maintain connections to an external storage system, manage partitions, and/or handle content streams. An API specification may also identify methods supported by a particular COM object.

Examples of methods called by an archiving platform and defined in an API specification include initialization methods (i.e., methods for initializing an API, read methods (i.e., methods for retrieving content streams from an external storage system), write methods (i.e., methods for storing content streams to an external storage system), retention methods (i.e., methods for updating retention of a content stream), metadata update methods (i.e., methods for updating metadata associated with a content stream), information methods (i.e., methods for obtaining information about a content stream), delete methods (i.e., methods for removing a content stream from an external storage system), capacity methods (i.e., methods for determining the current capacity and/or free space of an external storage system), and/or enumeration methods (i.e., methods for enumerating contents of an external storage system).

In addition to defining COM interfaces implemented by an archiving-platform-specific API and called by an archiving platform, an API specification may define COM interfaces implemented by an archiving platform and called by an archiving-platform-specific API. Examples of methods called by an archiving-platform-specific API and defined in an API specification may include get property methods (i.e., methods for retrieving storage system specific property values stored within the archiving platform), tracing methods (i.e., methods for tracing a message to an archiving platform trace system to provide detailed tracing information that can be used during troubleshooting), log methods (i.e., methods for logging a message to the archiving platform event log to provide relevant and meaningful messages to an administrator), termination methods (i.e., methods for performing shutdown), and/or any other methods.

An API specification may be created for a specific archiving platform in a variety of manners. For example, an API specification may be created manually by including a description of functionality of the specific archiving platform in a text document (or any other type of document). In such embodiments, definition module 104 may include a text editor, a word processor, or any other software tool that may be used for creating an API specification. Additionally or alternatively, an API specification may be partially or completely generated automatically. For example, definition module 104 may evaluate an archiving platform to determine functionality of the archiving platform. Definition module 104 may then create an API specification based on the determined functionality.

Return to FIG. 3, at step 304 providing module 106 may provide the API specification to a storage system vendor. Providing module 106 may provide the API specification to a storage system vendor in a variety of manners. For example, providing module 106 may provide the API specification to a storage system vendor by storing the API specification to a location (e.g., a web server or other location accessible via the Internet) accessible by the storage system vendor. In some embodiments, providing module 106 may upload the API specification to a website associated with a provider of the specific archiving platform described by the API specification. Providing module 106 may additionally or alternatively provide the API specification to a storage system vendor by emailing or otherwise sending the API specification to the storage system vendor. Thus, providing module 106 may include an email agent, an interface for uploading materials to a web site, and/or any other code that may be used in the process of enabling a storage system vendor to access the API specification.

After the API specification is provided to a storage system vendor, the storage system vendor may use the API specification to create an API specific to the archiving platform defined in the API specification. The process of creating an archiving-platform-specific API is described in greater detail in the discussion corresponding to FIG. 4. The storage system vendor may include the API with a storage system and provide the storage system to the archiving platform provider. Then, at step 306, the specific archiving platform (which may include archiving module 108) may archive data to the storage system provided by the storage system vendor. The specific archiving platform may archive the data by calling the API created by the storage system vendor and then communicating with the storage system through the API.

Figure 4:
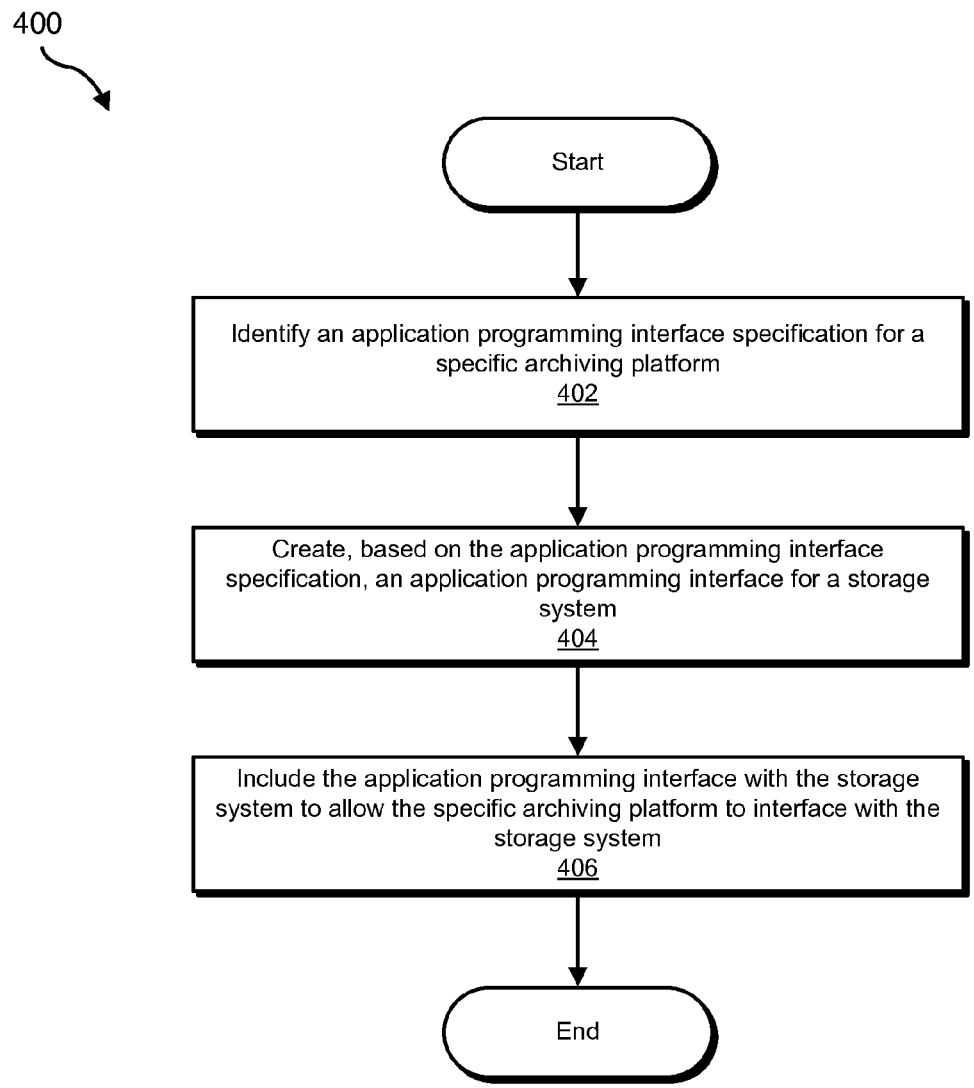
FIG. 4 is a flow diagram of an exemplary method for including an archiving-platform-specific interface with a storage system.

FIG. 4 is a flow diagram of an exemplary computer-implemented method 400 for creating an archiving-platform-specific storage interface. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2. For example, at step 410 identification module 110 may, as part of computing subsystem 208, identify an API specification for a specific archiving platform.

Identification module 110 may identify the API specification in any suitable manner. For example, identification module 110 may locate the API specification at a web site associated with the archiving platform provider that created the API specification. Additionally or alternatively, identification module 110 may locate the API specification in a database of API specifications (e.g., API specification database 122), may receive the API specification directly from the archiving platform provider, and/or may identify the API specification in any other way. Thus, identification module 110 may include an email agent, an interface for retrieving materials from a remote storage device (e.g., a web browser), and/or any other code that may be used to identify an API specification.

At step 404, creation module 112 may create, based on the API specification, an API for a storage system. Creation module 112 may implement one or more of the functionalities, features, and/or other specifications detailed in the API specification. For example, creation module 112 (which may include one or more software development tools) may create the API by programming the API to allow storage system configuration data to be managed from within the specific archiving platform. In some embodiments, creation module 112 may identify a specification of data retention functionality of the specific archiving platform in the API specification and may program the API to support the data retention functionality of the specific archiving platform.

According to certain embodiments, creation module 112 may identify a specification of metadata management functionality of the specific archiving platform in the API specification and program the API to support the metadata management functionality of the specific archiving platform. Additionally or alternatively, creation module 112 may identify a specification of external regulation compliance functionality of the specific archiving platform in the API specification and may program the API to support the external regulation compliance functionality of the specific archiving platform. In certain embodiments, creation module 112 may identify a specification of data securing functionality of the specific archiving platform in the API specification and may program the API to support the data securing functionality of the specific archiving platform. In some embodiments, creation module 112 may identify, in the API specification, a specification of functionality of the specific archiving platform for interfacing with a Write Once/Read Many ("WORM") storage system and may program the API to support the functionality of the specific archiving platform for interfacing with a WORM storage system. Creation module 112 may also program the API to support any other functionality described in the API specification.

After creating the API, creation module 112 may, at step 406, include the API with a storage system to allow the specific archiving platform to interface with the storage system. In some embodiments, the API may be included with the storage system as firmware or software packaged with the storage system. The API may also be included with the storage system in any other manner.

As an example of the processes shown in FIGS. 3 and 4, an archiving platform provider may use definition module 104 on computing subsystem 202 to create API specification 123 for a specific archiving platform. The archiving platform provider may then use providing module 106 to send API specification 123 to computing subsystem 204, where API specification 123 may be hosted. A storage system vendor may, using identification module 110 on computing system 208, identify API specification 123. The storage system vendor may then, using creation module 112, create archiving-platform specific API 207 in compliance with API specification 123. Creation module 112 may then include archiving-platform-specific API with a storage system, and the storage system may be included in computing subsystem 206. The archiving platform (e.g., archiving module 108) may then use archiving-platform-specific API 207 to store archived data 125 on the storage system.

Figure 5:
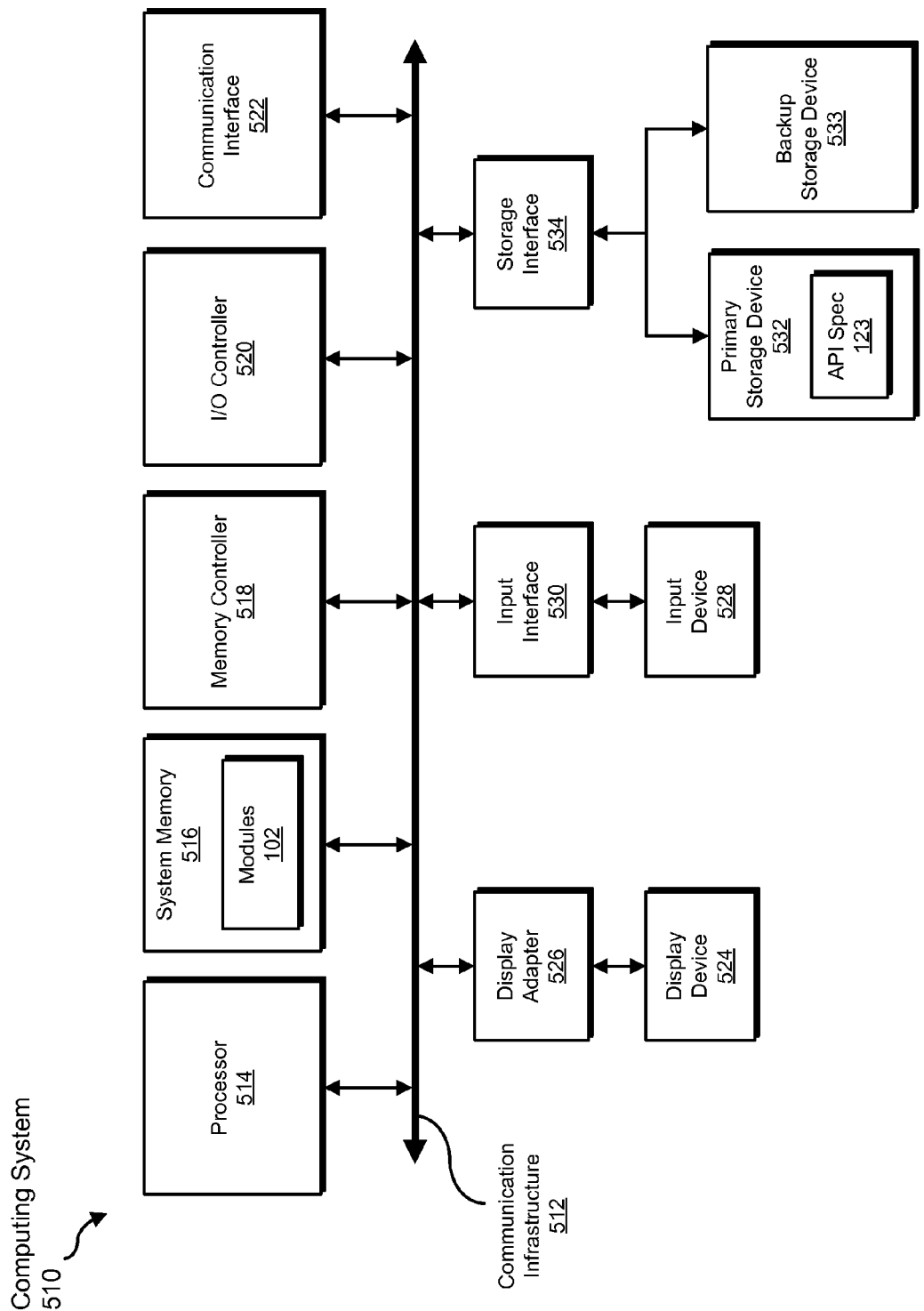
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the defining, providing, archiving, calling, communicating, identifying, creating, and including steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as defining, providing, archiving, calling, communicating, identifying, creating, and including.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the defining, providing, archiving, calling, communicating, identifying, creating, and including steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the defining, providing, archiving, calling, communicating, identifying, creating, and including steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the defining, providing, archiving, calling, communicating, identifying, creating, and including steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, API specification 123 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the defining, providing, archiving, calling, communicating, identifying, creating, and including steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions.

Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
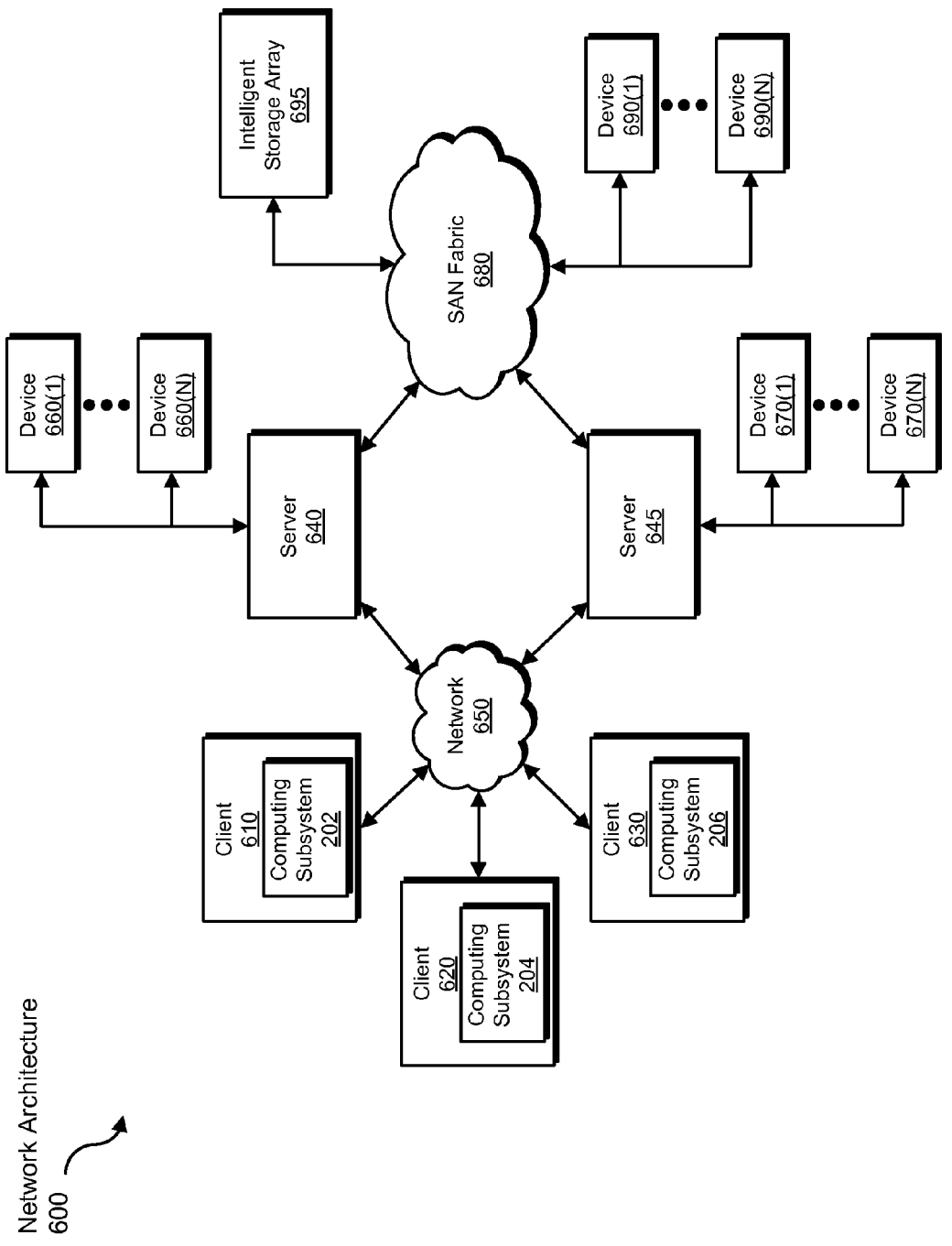
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may including computing subsystem 202 from FIG. 2, client 620 may include computing subsystem 204 from FIG. 2, and client 630 may include computing subsystem 206 from FIG. 2.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the defining, providing, archiving, calling, communicating, identifying, creating, and including steps disclosed herein. Network architecture 600 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, archiving platform-specific APIs may be made available through a cloud computing environment and/or one or more of modules 102 may operate in a cloud computing environment.

One or more of the software modules described herein may transform data, physical devices, and/or representations of physical devices from one form to another. For example, creation module 112 may transform an API specification into an API.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method, at least a portion of the method being performed by a computing device comprising at least one processor, the computer-implemented method comprising:
    determining functionality supported by a specific archiving platform by evaluating the specific archiving platform;
    defining an application programming interface specification for the specific archiving platform based on the determined functionality;
    providing the application programming interface specification to a storage system vendor such that the storage system vendor may create, based on the application programming interface specification, an application programming interface for a storage system provided by the storage system vendor;
    archiving, using the specific archiving platform, data to the storage system, wherein archiving the data comprises:
        the specific archiving platform calling an application programming interface created using the application programming interface specification;
        the specific archiving platform communicating with the storage system through the application programming interface.

2. The computer-implemented method of claim 1, wherein defining the application programming interface specification comprises describing how to integrate with the specific archiving platform to enable storage system configuration data to be managed from within the specific archiving platform.

3. The computer-implemented method of claim 1, wherein the application programming interface specification defines a data retention method called by the specific archiving platform, wherein the data retention method updates retention of a content stream.

4. The computer-implemented method of claim 1, wherein the application programming interface specification defines at least one metadata management method of the specific archiving platform, wherein the metadata management method updates metadata associated with a content stream.

5. The computer-implemented method of claim 1, wherein the application programming interface specification defines external regulation compliance functionality of the specific archiving platform by defining how the specific archiving platform is used to comply with governmental regulations.

6. The computer-implemented method of claim 1, wherein the application programming interface specification defines at least one of disk-to-disk mirroring functionality or encryption functionality supported by the specific archiving platform.

7. The computer-implemented method of claim 1, wherein the application programming interface specification defines functionality of the specific archiving platform for interfacing with a Write Once/Read Many ("WORM") storage system.

8. The computer-implemented method of claim 1, wherein:
    the application programming interface is defined by an archiving platform provider;
    the specific archiving platform comprises a particular archiving platform from the archiving platform provider;
    the application programming interface specification defines the functionality of the specific archiving platform;
    the archiving platform provider provides the application programming interface specification to the storage system vendor such that the storage system vendor creates the application programming interface specific to the archiving platform defined in the application programming interface specification.

9. The computer-implemented method of claim 1, tangibly embodied as non-transitory computer-executable instructions on at least one computer-readable-storage medium.

10. A computer-implemented method, at least a portion of the method being performed by a computing device comprising at least one processor, the computer-implemented method comprising:
    identifying an application programming interface specification based on a functionality supported by a specific archiving platform;
    creating, based on the application programming interface specification, an application programming interface for a storage system;
    including the application programming interface with the storage system to allow the specific archiving platform to archive data to the storage system by communicating with the storage system through the application programming interface.

11. The computer-implemented method of claim 10, wherein
    the application programming interface is defined by an archiving platform provider that develops the specific archiving platform.

12. The computer-implemented method of claim 11, wherein identifying the application programming interface specification comprises obtaining the application programming interface specification directly from the archiving platform provider by locating the application programming interface specification at a website associated with the archiving platform provider.

13. The computer-implemented method of claim 10, further comprising:
   identifying a specification of metadata management functionality of the specific archiving platform in the application programming interface specification, wherein creating the application programming interface comprises implementing the metadata management functionality described in the application programming interface specification by programming the application programming interface to support the metadata management functionality of the specific archiving platform.

14. The computer-implemented method of claim 10, further comprising:
   identifying a specification of external regulation compliance functionality of the specific archiving platform in the application programming interface specification, wherein creating the application programming interface comprises implementing the external regulation compliance functionality described in the application programming interface specification by programming the application programming interface to support the external regulation compliance functionality of the specific archiving platform.

15. The computer-implemented method of claim 10, further comprising:
   identifying a specification of data securing functionality of the specific archiving platform in the application programming interface specification, wherein creating the application programming interface comprises implementing the data securing functionality described in the application programming interface specification by programming the application programming interface to support the data securing functionality of the specific archiving platform.

16. The computer-implemented method of claim 10, further comprising:
   identifying a specification of data retention functionality of the specific archiving platform in the application programming interface specification, wherein creating the application programming interface comprises implementing the data retention functionality described in the application programming interface specification by programming the application programming interface to support the data retention functionality of the specific archiving platform.

17. The computer-implemented method of claim 10, tangibly embodied as non-transitory computer-executable instructions on at least one computer-readable-storage medium.

18. A system comprising:
   at least one hardware processor;
   determining functionality supported by a specific archiving platform by evaluating the specific archiving platform;
   defining an application programming interface specification for the specific archiving platform based on the determined functionality, wherein the application programming interface specification defines the functionality of the specific archiving platform;
   a communication interface configured to provide the application programming interface specification to a storage system vendor such that the storage system vendor may create, based on the programming interface specification, an application programming interface for a storage system provided by the storage system vendor;
   an archiving platform programmed to direct the processor to archive data to the storage system provided by the storage system vendor by:
      calling an application programming interface that complies with and was developed based on the application programming interface specification;
      communicating with the storage system through the application programming interface.

19. The system of claim 18, wherein the application programming interface specification defines data retention functionality of the specific archiving platform.

20. The system of claim 18, wherein the application programming interface specification defines data securing functionality of the specific archiving platform.

* * * * *